United States Patent [19]
Takeuchi et al.

[11] Patent Number: 6,117,591
[45] Date of Patent: Sep. 12, 2000

[54] HYDROGEN FLUORIDE ADDITIVE FOR NONAQUEOUS ELECTROLYTE IN ALKALI METAL ELECTROCHEMICAL CELLS

[75] Inventors: Esther S. Takeuchi, East Amherst; Randolph A. Leising, Williamsville, both of N.Y.

[73] Assignee: Wilson Greatbatch Ltd., Clarence, N.Y.

[21] Appl. No.: 09/085,212

[22] Filed: May 27, 1998

[51] Int. Cl.[7] .................................................. H01M 4/58
[52] U.S. Cl. ........................ 429/231.95; 429/231.2; 429/325; 429/326; 429/328; 429/329; 429/330; 429/332; 429/333; 429/334; 429/335
[58] Field of Search ........................ 429/231.9, 231.95, 429/231.2, 325, 326, 329, 328, 330, 332, 333, 334, 335

[56] References Cited

U.S. PATENT DOCUMENTS

| | | | |
|---|---|---|---|
| 3,825,445 | 7/1974 | MacCarthy | 136/83 |
| 4,273,839 | 6/1981 | Carr et al. | 429/51 |
| 4,663,249 | 5/1987 | Gordon | 429/14 |
| 4,670,358 | 6/1987 | Gordon et al. | 429/15 |
| 4,814,241 | 3/1989 | Nagashima et al. | 429/199 |
| 5,472,810 | 12/1995 | Takeuchi et al. | 429/218 |

FOREIGN PATENT DOCUMENTS

| | | | |
|---|---|---|---|
| 02-144860 | 6/1990 | Japan | H01M 10/40 |
| 07-282848 | 10/1995 | Japan | H01M 10/40 |
| 07-302613 | 11/1995 | Japan | H01M 10/40 |

*Primary Examiner*—Maria Nuzzolillo
*Assistant Examiner*—Angela J. Martin
*Attorney, Agent, or Firm*—Hodgson Russ Andrews Woods & Goodyear LLP

[57] ABSTRACT

An alkali metal, solid cathode, nonaqueous electrochemical cell capable of delivering high current pulses, rapidly recovering its open circuit voltage and having high current capacity, is described. The stated benefits are realized by the addition of hydrogen fluoride to the nonaqueous electrolyte comprising an alkali metal salt dissolved in a mixture of a low viscosity solvent and a high permittivity solvent. A preferred solvent mixture includes propylene carbonate, dimethoxyethane and hydrogen fluoride having $LiAsF_6$ or $LiPF_6$ dissolved therein.

12 Claims, 2 Drawing Sheets

HYDROGEN FLUORIDE ADDITIVE FOR NONAQUEOUS ELECTROLYTE IN ALKALI METAL ELECTROCHEMICAL CELLS

BACKGROUND OF INVENTION

1. Field of the Invention

The present invention generally relates to an alkali metal electrochemical cell, and more particularly, to an alkali metal cell suitable for current pulse discharge applications with reduced or no appreciable voltage delay. Still more particularly, the present invention relates to a lithium electrochemical cell activated with an electrolyte having hydrogen fluoride as an additive for the purpose of reducing and/or eliminating voltage delay under current pulse discharge applications. Voltage delay is a phenomenon typically exhibited in an alkali metal/transition metal oxide cell, and particularly, a lithium/silver vanadium oxide cell, that has been depleted of 40% to 70% of its capacity and is subjected to current pulse discharge applications.

The voltage response of a cell which does not exhibit voltage delay during the application of a short duration pulse or pulse train has distinct features. First, the cell potential decreases throughout the application of the pulse until it reaches a minimum at the end of the pulse, and second, the minimum potential of the first pulse in a series of pulses is higher than the minimum potential of the last pulse.

On the other hand, the voltage response of a cell which exhibits voltage delay during the application of a short duration pulse or during a pulse train can take one or both of two forms. One form is that the leading edge potential of the first pulse is lower than the end edge potential of the first pulse. In other words, the voltage of the cell at the instant the first pulse is applied is lower than the voltage of the cell immediately before the first pulse is removed. The second form of voltage delay is that the minimum potential of the first pulse is lower than the minimum potential of the last pulse when a series of pulses have been applied.

The initial drop in cell potential during the application of a short duration pulse reflects the resistance of the cell, i.e., the resistance due to the cathode-electrolyte interface and the anode-electrolyte interface and due to polarization. In the absence of voltage delay, the resistance due to passivated films on the anode and/or cathode is negligible. However, the formation of a surface film is unavoidable for alkali metal, and in particular, lithium metal anodes, and for lithium intercalated carbon anodes, due to their relatively low potential and high reactivity towards organic electrolytes. Thus, the ideal anode surface film should be electrically insulating and ionically conducting. While most alkali metal, and in particular, lithium electrochemical systems meet the first requirement, the second requirement is difficult to achieve. In the event of voltage delay, the resistance of these films is not negligible, and as a result, impedance builds up inside the cell due to this surface layer formation which often results in reduced discharge voltage and reduced cell capacity. In other words, the drop in potential between the background voltage and the lowest voltage under pulse discharge conditions, excluding voltage delay, is an indication of the conductivity of the cell, i.e., the conductivity of the cathode, anode, electrolyte, and surface films, while the gradual decrease in cell potential during the application of the pulse train is due to the polarization of the electrodes and electrolyte.

Thus, the existence of voltage delay is an undesirable characteristic of alkali metal/mixed metal oxide cells subjected to current pulse discharge conditions in terms of its influence on devices such as medical devices including implantable pacemakers and cardiac defibrillators. Voltage delay is undesirable because it limits the effectiveness and even the proper functioning of both the cell and the associated electrically powered device under current pulse discharge conditions.

2. Prior Art

One of the known solutions to the above problem is to saturate the electrolyte solution with carbon dioxide $CO_2$. Cycling efficiency is improved dramatically in secondary cell systems having a lithium anode activated with $CO_2$ saturated electrolytes (V. R. Koch and S. B. Brummer, *Electrochimica Acta*, 1978, 23, 55–62; U.S. Pat. No. 4,853, 304 to Ebner et al.; D. Aurbach, Y. Gofer, M. Ben-Zion and P. Aped, *J. Electroanal. Chem.* 1992, 339, 451–471). U.S. Pat. No. 5,569,558 to Takeuchi et al. relates to the provision of a $CO_2$ saturated electrolyte for alleviating the presence of voltage delay in primary cells having a mixed transition metal oxide cathode such as lithium/silver vanadium oxide cells. The same effect is also known for lithium intercalated carbon anode secondary batteries (D. Aurbach, Y. Ein-Eli, O. Chusid, Y. Carmeli, M. Babai and H. Yamin, *J. Electrochem. Soc.* 1994, 141, 603–611). Sulfur dioxide ($SO_2$) has also been reported to be another additive that improves charge-discharge cycling in rechargeable lithium ion cells (Y. Ein-Eli, S. R. Thomas and V. R. Koch, *J. Electrochem. Soc.* 1996, 143, L195–L197).

In spite of the success of $CO_2$ and $SO_2$ in improving cell discharge characteristics, their use has been limited. One problem associated with both $CO_2$ and $SO_2$ as electrolyte additives is that they are in a gaseous state at room temperature, and are thus difficult to handle. Also, it is difficult to control the dissolved concentration of $CO_2$. Best results are achieved at pressures of up to 50 psig., which further detracts from the practicality of this additive.

Instead of carbon dioxide and sulfur dioxide, the present invention is directed to the provision of hydrogen fluoride in the electrolyte of an alkali metal electrochemical cell to beneficially modify the anode surface film. The hydrogen fluoride additive is in a condensed phase which makes it easy to handle in electrolyte preparation and is provided as a co-solvent with commonly used organic aprotic solvents. When used as a co-solvent in an activating electrolyte, the additive interacts with the alkali metal anode to form an ionically conductive surface protective layer thereon. The conductive surface layer improves the discharge performance of the alkali metal electrochemical cell and minimizes or even eliminates voltage delay in the high current pulse discharge of such cells.

SUMMARY OF THE INVENTION

The object of the present invention is to improve the pulse discharge performance of an alkali metal electrochemical cell, and more particularly a primary lithium electrochemical cell, by the provision of hydrogen fluoride as a co-solvent in the cell's activating nonaqueous electrolyte solution. Due to the high reduction potential of the fluoride group vs. lithium, the hydrogen fluoride additive competes effectively with the other electrolyte co-solvents or the solute to react with the lithium anode. Lithium fluoride is believed to be the major reaction products. This lithium salt is believed to deposit on the anode surface to form an ionically conductive protective film thereon. As a consequence, the chemical composition and perhaps the morphology of the anode surface protective layer is changed, and this proves beneficial to the discharge characteristics of the cell.

The thusly fabricated cell exhibits reduced or no appreciable voltage delay under current pulse discharge usage, which is an unexpected result. More particularly, the present invention is directed to the introduction of hydrogen fluoride into the electrolyte of a lithium/silver vanadium oxide electrochemical cell for the purpose of reducing and/or eliminating voltage delay during pulse discharging applications. Alkali metal/transition metal oxide electrochemical systems are typically activated with an electrolyte comprising a relatively low viscosity solvent and a relatively high permittivity solvent. The solute of the electrolyte is an inorganic alkali metal salt wherein the alkali metal of the salt is the same as the alkali metal of the anode. According to the present invention, hydrogen fluoride is introduced into the electrolyte as an additive to interact with the alkali metal anode, and particularly with the lithium anode, to form an ionically conductive protective anode surface layer which improves the discharge performance of the cell, and minimizes or even eliminates voltage delay in current pulse discharge conditions. Therefore, the present invention is directed to a novel electrolyte solution provided in operative association with an electrochemical system incorporated into a defibrillator battery to minimize or even eliminate voltage delay under high current pulse discharge conditions.

These and other objects of the present invention will become increasingly more apparent to those skilled in the art by reference to the following description and to the drawings.

DETAILED DESCRIPTION OF THE PREFERRED EMBODIMENTS

Figure 1:
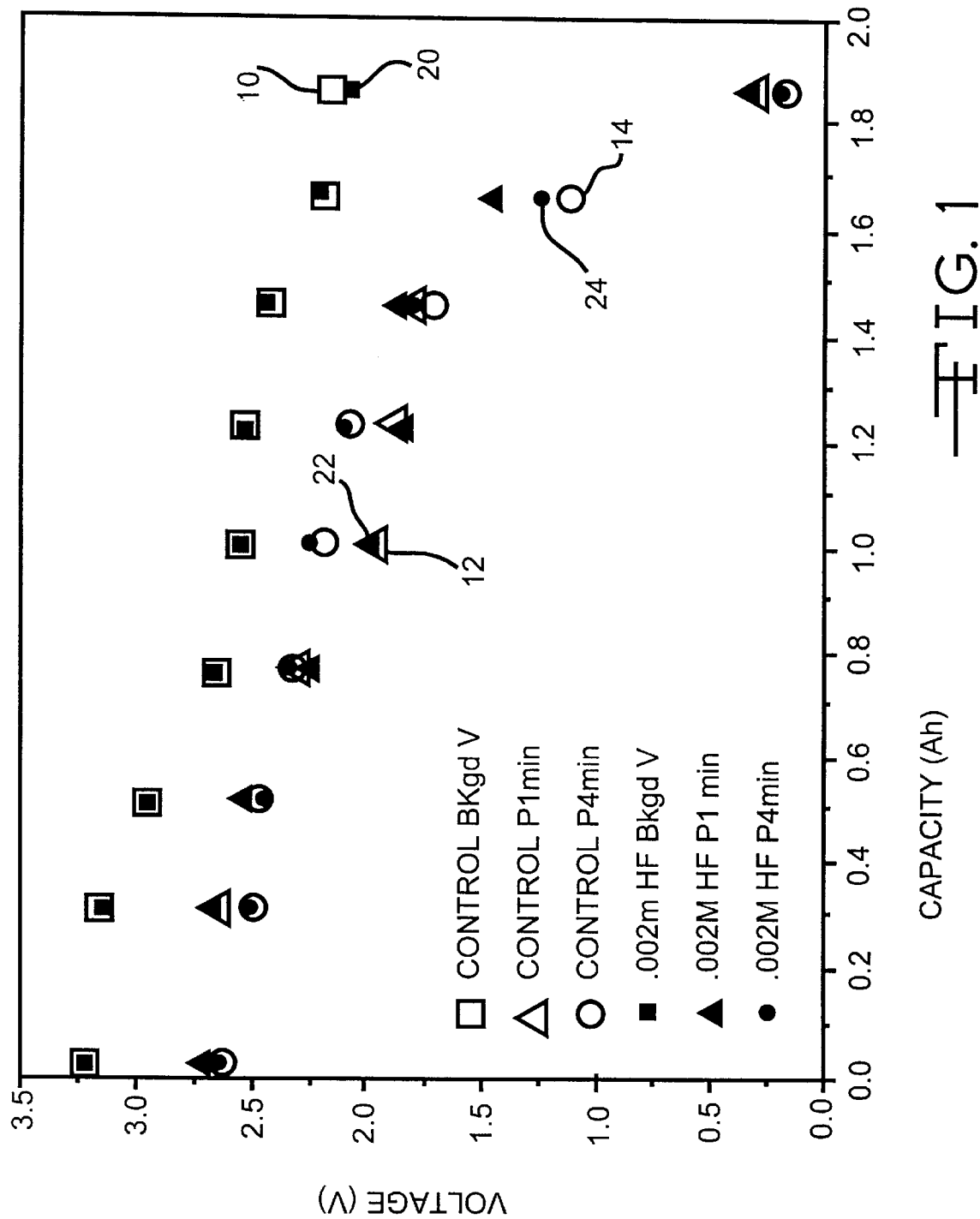
FIGS. 1 and 2 are graphs contrasting the pulse discharge of prior art control cells in comparison to cells built according to the present invention having hydrogen fluoride added to the electrolyte.

As used herein, the term "pulse" means a short burst of electrical current of a significantly greater amplitude than that of a current immediately prior to the pulse. A pulse train consists of at least two pulses of electrical current delivered in relatively short succession with or without open circuit rest between the pulses.

The electrochemical cell of the present invention includes an anode selected from Groups IA, IIA or IIIB of the Periodic Table of Elements, including lithium, sodium, potassium, etc., and their alloys and intermetallic compounds including, for example Li-Si, Li-B and Li-Si-B alloys and intermetallic compounds. The preferred anode comprises lithium, and the more preferred anode comprises a lithium alloy, the preferred lithium alloy being a lithium-aluminum alloy. The greater the amount of aluminum present by weight in the alloy, however, the lower the energy density of the cell.

The form of the anode may vary, but preferably the anode is a thin metal sheet or foil of the anode metal, pressed or rolled on a metallic anode current collector, i.e., preferably comprising nickel, to form an anode component. In the exemplary cell of the present invention, the anode component has an extended tab or lead of the same material as the anode current collector, i.e., preferably nickel, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The cathode is preferably of a solid material and the electrochemical reaction at the cathode involves conversion of ions which migrate from the anode to the cathode in atomic or molecular forms. The solid cathode material may comprise a metal, a metal oxide, a mixed metal oxide, a metal sulfide or a carbonaceous compound, and combinations thereof. The metal oxide, the mixed metal oxide and the metal sulfide can be formed by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups IB, IIB, IIIB, IVB, VB, VIB, VIIB and VIII, which includes the noble metals and/or other oxide and sulfide compounds.

One preferred mixed metal oxide has the general formula $SM_xV_2O_y$ wherein SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide (SVO) having the general formula $Ag_xV_2O_y$, in any one of its many phases, i.e., β-phase silver vanadium oxide having in the general formula x=0.35 and y=5.8, γphase silver vanadium oxide having in the general formula x=0.74 and y=5.37 and ε-phase silver vanadium oxide having in the general formula x=1.0 and y=5.5, and combination and mixtures of phases thereof. For a more detailed description of such a cathode active material reference is made to U.S. Pat. No. 4,310,609 to Liang et al., which is assigned to the assignee of the present invention and incorporated herein by reference.

Another preferred composite cathode active material includes $V_2O_z$ wherein $z \leq 5$ combined with $Ag_2O$ with the silver in either the silver(II), silver(I) or silver(0) oxidation state and CuO with the copper in either the copper(II), copper(I) or copper(0) oxidation state to provide the mixed metal oxide having the general formula $Cu_xAg_yV_2O_z$, (CSVO). Thus, this composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about $0.01 \leq x \leq 1.0$, about $0.01 \leq y \leq 1.0$ and about $5.01 \leq z \leq 6.5$. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material reference is made to U.S. Pat. Nos. 5,472,810 to Takeuchi et al. and 5,516,340 to Takeuchi et al., both of which are assigned to the assignee of the present invention and incorporated herein by reference.

Additional cathode active materials include manganese dioxide, lithium cobalt oxide, lithium nickel oxide, copper vanadium oxide, titanium disulfide, copper oxide, copper sulfide, iron sulfide, iron disulfide, and fluorinated carbon, and mixtures thereof. Preferably, the cathode comprises from about 80 to about 99 weight percent of the cathode active material.

Cathode active materials prepared as described above are preferably mixed with a binder material such as a powdered fluoro-polymer, more preferably powdered polytetrafluoro-ethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 3 weight percent, a conductive diluent present at about 3 weight percent and about 94 weight percent of the cathode active material. The cathode active mixture may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the Group IA, IIA or IIIB anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include woven and non-woven fabrics of polyolefinic fibers or fluoropolymeric fibers including polyvinylidene fluoride, polyethylenetetrafluoro-ethylene, and polyethylenechlorotrifluoroethylene laminated or superposed with a polyolefinic or a fluoropolymeric microporous film. Suitable microporous films include a polytetrafluoro-ethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.). The separator may also be composed of non-woven glass, glass fiber materials and ceramic materials.

The form of the separator typically is a sheet which is placed between the anode and cathode electrodes and in a manner preventing physical contact therebetween. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The electrochemical cell of the present invention further includes a nonaqueous, ionically conductive electrolyte operatively associated with the anode and the cathode electrodes. The electrolyte serves as a medium for migration of ions between the anode and the cathode during the electrochemical reactions of the cell and nonaqueous solvents suitable for the present invention are chosen so as to exhibit those physical properties necessary for ionic transport (low viscosity, low surface tension and wettability). Suitable nonaqueous solvents are comprised of an inorganic salt dissolved in a nonaqueous solvent and more preferably an alkali metal salt dissolved in a mixture of aprotic organic solvents comprising a low viscosity solvent including organic esters, ethers and dialkyl carbonates, and mixtures thereof, and a high permittivity solvent including cyclic carbonates, cyclic esters and cyclic amides, and mixtures thereof. Low viscosity solvents include tetrahydrofuran (THF), diisopropylether, methyl acetate (MA), diglyme, triglyme, tetraglyme, 1,2-dimethoxyethane (DME), 1,2-diethoxyethane (DEE), 1-ethoxy,2-methoxyethane (EME), dimethyl carbonate (DMC), diethyl carbonate (DEC), dipropyl carbonate (DPC), ethyl methyl carbonate (EMC), methyl propyl carbonate (MPC) and ethyl propyl carbonate (EPC), and mixtures thereof. High permittivity solvents include propylene carbonate (PC), ethylene carbonate (EC), butylene carbonate (BC), acetonitrile, dimethyl sulfoxide, dimethyl formamide, dimethyl acetamide, $\gamma$-valerolactone, $\gamma$-butyrolactone (GBL) and N-methyl-pyrrolidinone (NMP), and mixtures thereof.

The preferred electrolyte comprises an inorganic alkali metal salt, and in the case of an anode comprising lithium, the alkali metal salt of the electrolyte is a lithium based salt. Known lithium salts that are useful as a vehicle for transport of alkali metal ions from the anode to the cathode include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiO_2$, $LiB(C_6H_5)_4$ and $LiCF_3SO_3$, and mixtures thereof. Suitable salt concentrations typically range between about 0.8 to 1.5 molar, and a preferred electrolyte for a lithium/transition metal oxide electrochemical cell includes $LiAsF_6$ or $LiPF_6$ dissolved in a 50:50 mixture, by volume, of PC and DME.

In accordance with the present invention, hydrogen fluoride is provided as a co-solvent in the electrolyte solution of the previously described alkali metal electrochemical cell. The concentration of the hydrogen fluoride additive according to the present invention should preferably be in the range of between about 0.001 M to about 0.20M. The positive effects of this additive in reducing voltage delay in a pulse discharging alkali metal cell have been achieved both at room temperature as well as at temperatures up to about 37° C. This makes the novel electrolyte solution of the present invention particularly useful for activating an alkali metal/transition metal oxide cell incorporated into an implantable medical device such as a cardiac defibrillator to minimize or even eliminate voltage delay under high current pulse discharge conditions.

As is well known by those skilled in the art, an implantable cardiac defibrillator is a device that requires a power source for a generally medium rate, constant resistance load component provided by circuits performing such functions as, for example, the heart sensing and pacing functions. From time to time, the cardiac defibrillator may require a generally high rate, pulse discharge load component that occurs, for example, during charging of a capacitor in the defibrillator for the purpose of delivering an electrical shock to the heart to treat tachyarrhythmias, the irregular, rapid heartbeats that can be fatal if left uncorrected. Reduction and even elimination of voltage delay during a current pulse application is important for proper device operation and extended device life.

While not intending to be bound by any particular mechanism, it is believed that the bond between hydrogen and fluorine is severed and the fluorine atom is able to compete effectively with the other electrolyte solvents or solutes to react with lithium and form a fluorine salt, i.e., lithium fluorine, on the surface of the anode. The resulting salt is more conductive than lithium oxide which may form on the anode in the absence of the hydrogen fluorine additive. As a consequence, the chemical composition and perhaps the morphology of the anode surface protective layer is believed to be changed with concomitant benefits to the cell's discharge characteristics.

In the present invention, the anode is lithium metal and the cathode is preferably the transition mixed metal oxide AgV$_2$O$_{5.5}$ (SVO). The preferred electrolyte is 1.0 to 1.2 M LiAsF$_6$ dissolved in an aprotic solvent mixture comprising at least one of the above listed low viscosity solvents and at least one of the above listed high permittivity solvents. The preferred aprotic solvent mixture comprises a 50/50, by volume, mixture of propylene carbonate and dimethoxyethane.

The assembly of the cell described herein is preferably in the form of a wound element cell. That is, the fabricated cathode, anode and separator are wound together in a "jellyroll" type configuration or "wound element cell stack" such that the anode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23 or FUSITE 425 or FUSITE 435. The positive terminal pin feedthrough preferably comprises titanium although molybdenum, aluminum, nickel alloy, or stainless steel can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte solution comprising the hydrogen fluoride additive described hereinabove and hermetically sealed such as by close-welding a stainless steel ball over the fill hole, but not limited thereto.

The above assembly describes a case-negative cell, which is the preferred construction of the exemplary cell of the present invention. As is well known to those skilled in the art, the exemplary electrochemical system of the present invention can also be constructed in a case-positive configuration.

The following examples describe the manner and process of an electrochemical cell according to the present invention, and set forth the best mode contemplated by the inventors of carrying out the invention, but are not construed as limiting.

EXAMPLE I

Lithium anode material was pressed on nickel current collector screen and a cathode admixture comprising, by weight 94% silver vanadium oxide mixed with 3% TEFLON 7A®, 2% graphite and 1% carbon black. A total of 6.6 grams of cathode mix was pressed on an expanded titanium current collector screen for each cell. A prismatic cell stack assembly configuration with two layers of microporous membrane polypropylene separator sandwiched between the anode and cathode was prepared. The electrode assembly was then hermetically sealed in a stainless steel casing in a case-negative configuration. Four cells were activated with the standard electrolyte consisting of 1.0M LiAsF$_6$ dissolved in a 50:50, by volume, mixture of PC and DME without hydrogen fluoride (Group 1). Eight additional cells (four cells per group) were activated with the same electrolyte used to activate the Group 1 cells and further containing 0.002M HF and 0.02M HF, respectively, as set forth in Table 1.

TABLE 1

| Cell Construction | | | |
|---|---|---|---|
| Cell Group | [LiAsF$_6$] | PC:DME | [HF] |
| 1 | 1.0 M | 50:50 | 0.00 M |
| 2 | 1.0 M | 50:50 | 0.002 M |
| 3 | 1.0 M | 50:50 | 0.02 M |

A constant resistive load of 2.49 kΩ was applied to all twelve cells for 17 hours during an initial predischarge burn-in period. The predischarge period is referred to as burnin and depleted the cells of approximately 1% of their theoretical capacity. Following burnin, the cells were subjected to acceptance pulse testing consisting of four 10 second pulses (18.4 mA/cm$^2$) with a 15 second rest between each pulse. The average discharge readings for the pre-pulse potentials, voltage delay and pulse minimum potentials during acceptance pulse testing for these pulse trains are summarized in Table 2.

TABLE 2

| Acceptance Pulse Train Voltages (average) | | | | |
|---|---|---|---|---|
| Cell Group | Ppre1 | V-Delay | P1min | P4min |
| 1 | 3.197 | 0.205 | 2.463 | 2.633 |
| 2 | 3.193 | 0.340 | 2.354 | 2.651 |
| 3 | 3.196 | 0.286 | 2.407 | 2.649 |

All groups of cells had similar pre-pulse potentials and all of the cells exhibited at least some voltage delay during acceptance pulse testing. Voltage delay is calculated as pulse 1 end potential minus pulse 1 minimum potential.

Following acceptance pulse testing, all of the cells were discharged under a constant resistance (11.0 kΩ) background load at 37° C. with superimposed pulse trains applied every 38 days. The pulse trains consisted of a 1.5 amp (18.4 mA/cm$^2$) pulse train of four pulses of ten seconds duration with fifteen seconds of rest between pulses. The average discharge reading for the pre-pulse potentials, voltage delay and pulse minimum potentials for pulse trains 1 to 9 as summarized in Tables 3 to 11, respectively.

TABLE 3

| Pulse Train 1 Voltages (average) | | | | | |
|---|---|---|---|---|---|
| Cell Group | [HF] | Ppre1 | V-Delay | P1min | P4min |
| 1 | 0.00 M | 3.216 | 0.000 | 2.724 | 2.631 |
| 2 | 0.002 M | 3.215 | 0.013 | 2.713 | 2.642 |
| 3 | 0.02 M | 3.214 | 0.039 | 2.694 | 2.642 |

TABLE 4

Pulse Train 2 Voltages (average)

| Cell Group | [HF]    | Ppre1 | V-Delay | P1min | P4min |
|------------|---------|-------|---------|-------|-------|
| 1          | 0.00 M  | 3.148 | 0.000   | 2.647 | 2.524 |
| 2          | 0.002 M | 3.145 | 0.000   | 2.658 | 2.541 |
| 3          | 0.02 M  | 3.139 | 0.025   | 2.614 | 2.530 |

TABLE 5

Pulse Train 3 Voltages (average)

| Cell Group | [HF]    | Ppre1 | V-Delay | P1min | P4min |
|------------|---------|-------|---------|-------|-------|
| 1          | 0.00 M  | 2.932 | 0.001   | 2.540 | 2.452 |
| 2          | 0.002 M | 2.931 | 0.000   | 2.535 | 2.446 |
| 3          | 0.02 M  | 2.924 | 0.002   | 2.512 | 2.438 |

TABLE 6

Pulse Train 4 Voltages (average)

| Cell Group | [HF]    | Ppre1 | V-Delay | P1min | P4min |
|------------|---------|-------|---------|-------|-------|
| 1          | 0.00 M  | 2.639 | 0.003   | 2.305 | 2.309 |
| 2          | 0.002 M | 2.641 | 0.056   | 2.258 | 2.312 |
| 3          | 0.02 M  | 2.639 | 0.077   | 2.242 | 2.315 |

TABLE 7

Pulse Train 5 Voltages (average)

| Cell Group | [HF]    | Ppre1 | V-Delay | P1min | P4min |
|------------|---------|-------|---------|-------|-------|
| 1          | 0.00 M  | 2.542 | 0.112   | 1.966 | 2.121 |
| 2          | 0.002 M | 2.541 | 0.140   | 1.994 | 2.181 |
| 3          | 0.02 M  | 2.540 | 0.086   | 2.074 | 2.212 |

TABLE 8

Pulse Train 6 Voltages (average)

| Cell Group | [HF]    | Ppre1 | V-Delay | P1min | P4min |
|------------|---------|-------|---------|-------|-------|
| 1          | 0.00 M  | 2.516 | 0.071   | 1.883 | 1.992 |
| 2          | 0.002 M | 2.516 | 0.119   | 1.848 | 2.010 |
| 3          | 0.02 M  | 2.515 | 0.101   | 1.870 | 2.012 |

TABLE 9

Pulse Train 7 Voltages (average)

| Cell Group | [HF]    | Ppre1 | V-Delay | P1min | P4min |
|------------|---------|-------|---------|-------|-------|
| 1          | 0.00 M  | 2.402 | 0.000   | 1.777 | 1.696 |
| 2          | 0.002 M | 2.410 | 0.000   | 1.821 | 1.763 |
| 3          | 0.02 M  | 2.407 | 0.001   | 1.803 | 1.736 |

TABLE 10

Pulse Train 8 Voltages (average)

| Cell Group | [HF]    | Ppre1 | V-Delay | P1min | P4min |
|------------|---------|-------|---------|-------|-------|
| 1          | 0.00 M  | 2.178 | 0.000   | 1.461 | 1.093 |
| 2          | 0.002 M | 2.183 | 0.000   | 1.463 | 1.191 |
| 3          | 0.02 M  | 2.181 | 0.000   | 1.471 | 1.209 |

TABLE 11

Pulse Train 9 Voltages (average)

| Cell Group | [HF]    | Ppre1 | V-Delay | P1min | P4min |
|------------|---------|-------|---------|-------|-------|
| 1          | 0.00 M  | 2.136 | 0.000   | 0.289 | 0.150 |
| 2          | 0.002 M | 2.049 | 0.000   | 0.313 | 0.156 |
| 3          | 0.02 M  | 2.034 | 0.000   | 0.248 | 0.134 |

During pulse discharge testing, all cells had similar prepulse potentials before the respective pulse trains. In pulse train 1, the groups 2 and 3 cells with the hydrogen fluoride additive experienced voltage delay while the control cells of groups 1 did not. In pulse train 2, only the group 3 cells showed voltage delay and in pulse train 3, none of the cells showed any appreciable voltage delay. In pulse train 4, the groups 2 and 3 cells experienced voltage delay as did the control cells, however, the pulse 4 minimum readings are similar for all cell groups. In pulse train 5, all groups of cells experienced voltage delay. However, the group 3 cells showed a significant reduction in voltage delay as compared to the group 2 cells and even the group 1 control cells. Additionally, the pulse 1 and 4 minimums for the group 3 cells are significantly improved over the control cells. Even the group 2 cells showed a significant improvement over the control cells in the pulse 4 minimum reading. In pulse trains 6 to 9, the pulse minimum voltages as well as the voltage delay readings of the control cells are similar in comparison to the groups 2 and 3 cells of the present invention.

Figure 2:
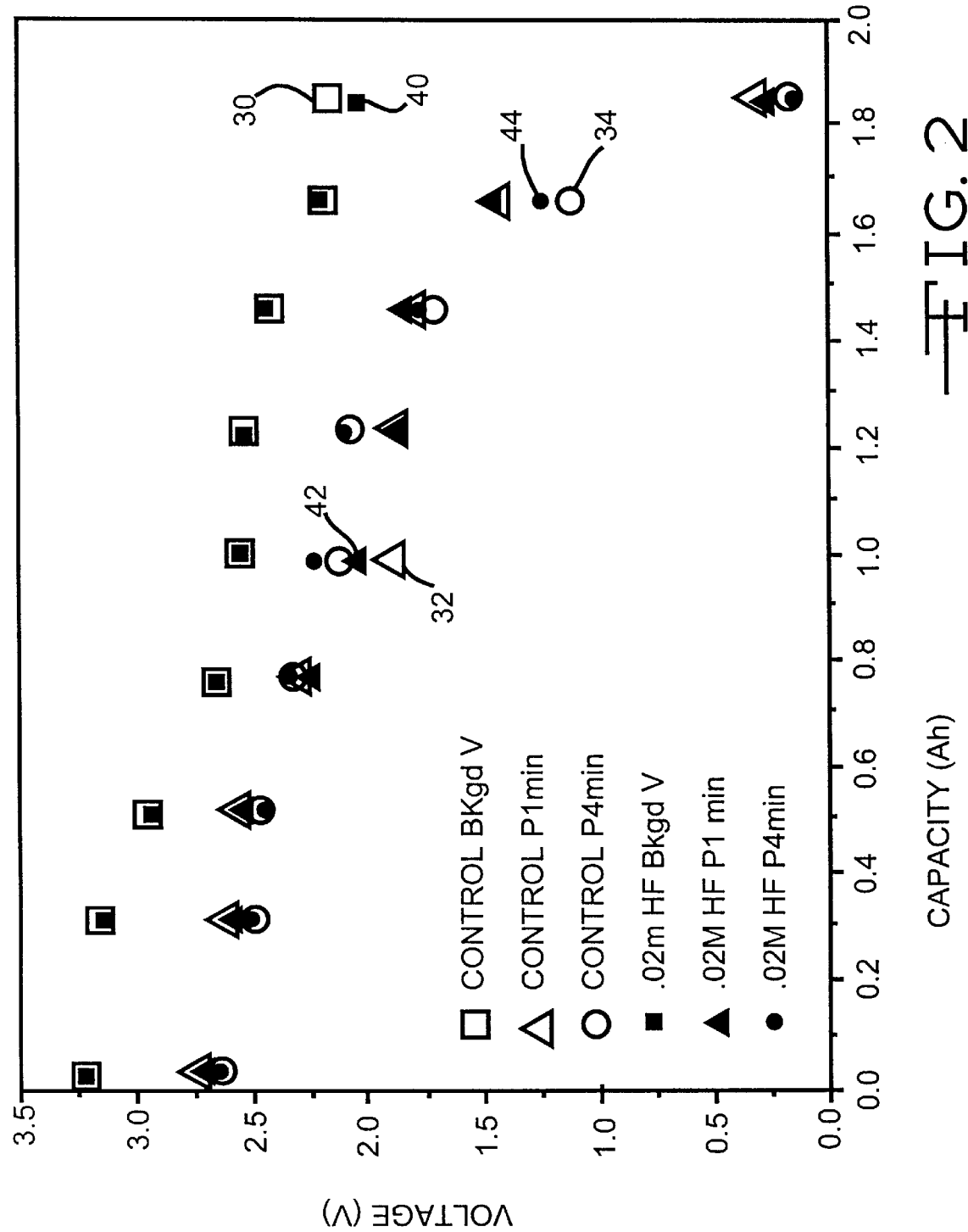

FIGS. 1 and 2 are graphs constructed from the pulse discharge of a representative one of the group 1 control cells and representative ones of the groups 2 and 3 cells having 0.002 M and 0.02 M of hydrogen fluoride added to the electrolyte, respectively. In particular, in FIG. 1 the plots inducted as 10 were constructed from the pre-pulse potentials of the group 1 control cells prior to the application of pulse trains 1 to 9, and the plots inducted as 12 and 14 were constructed from the pulse 1 minimum and pulse 4 minimum potentials, respectively, of those cells. In FIG. 1, the plots inducted as 20 were constructed from the pre-pulse potentials of the group 2 cells prior to the application of pulse trains 1 to 9, and the plots inducted as 22 and 24 were constructed from the pulse 1 minimum and pulse 4 minimum potentials, respectively, of those cells for the nine pulse trains.

In FIG. 2, the plots inducted as 30 were constructed from the pre-pulse potentials of the group 1 control cells prior to the application of pulse trains 1 to 9, and the plots inducted as 32 and 34 were constructed from the pulse 1 minimum and pulse 4 minimum potentials, respectively, of those cells for the nine pulse trains. In FIG. 2, the plots inducted as 40 were constructed from the pre-pulse potentials of the group 3 cells prior to the application of pulse trains 1 to 9, and the plots inducted as 42 and 44 were constructed from the pulse 1 minimum and pulse 4 minimum potentials, respectively, of those cells for the nine pulse trains. The plots indicated as 10 in FIG. 1 and 30 in FIG. 2 are identical.

EXAMPLE II

Lithium/silver vanadium oxide cells similar to those discharged in Example I were constructed. Again, the cells were divided into three groups (four cells per group). The cells were activated with the standard electrolyte containing 1.0 LiAsF$_6$ dissolved in a 50:50, by volume, mixture of PC and DME. The group 1 cells were devoid of hydrogen fluoride while the groups 2 and 3 cells contained 0.002 M and 0.02 M of hydrogen fluoride, respectively.

Following acceptance pulse testing, all of the cells were subjected to an accelerated discharge data regime by discharging them under a constant resistance (11.0 kΩ) background load at 37° C. with superimposed pulse trains applied every 30 minutes. The pulse trains consisted of a 1.5 amp (18.4 mA/cm$^2$) pulse train of four pulses of ten seconds duration with fifteen seconds of rest between pulses. The discharge capacity and cathode efficiency to various cutoffs is summarized in Table 12. Cathode efficiency was calculated by dividing the delivered capacity by the theoretical capacity for each cell. Theoretical capacity was determined by multiplying the gram amount of SVO in each cell by the theoretical capacity of SVO (295.7 mAh/g).

Under the accelerated discharge data regime, there was no difference in the capacity of the prior art and the present invention cells.

TABLE 12

Average Accelerated Discharge Data

| Cell Group | Capacity (mAh) | | | Cathode Efficiency | | |
|---|---|---|---|---|---|---|
| | To +2.0 V Cutoff | To +1.7V Cutoff | To +1.5V Cutoff | To +2.0 V Cutoff | To +1.7 V Cutoff | To +1.5 V Cutoff |
| 1 | 1388 | 1535 | 1593 | 71% | 79% | 82% |
| 2 | 1396 | 1543 | 1607 | 72% | 79% | 82% |
| 3 | 1399 | 1541 | 1600 | 72% | 79% | 82% |

EXAMPLE III

Again, lithium/silver vanadium oxide cells similar to those discharged in Example I were built and divided into three groups of four cells each. The cells were activated with the standard electrolyte containing 1.0M LiAsF$_6$ dissolved in a 50:50, by volume, mixtures of PC and DME. The group 1 cells were devoid of hydrogen fluoride while the groups 2 and 3 cells contained 0.002M and 0.02M of hydrogen fluoride, respectively. The cells were then subjected to burn-in and acceptance pulse testing followed by the accelerated discharge data regime. Self-discharge of these cells was calculated via microcalorimetry and the results are summarized in Table 13. Microcaloimetry was measured at 37° C. under open circuit conditions. Percent self discharge was calculated using the formula: (heat dissipation in $\mu$W/OCV in V)×0.00876=self discharge. The factor 0.00876 converts microwatts to watts and takes into account self discharge of the cells over a year's period.

TABLE 13

Summary of Microcalorimetry Results

| Cell Group | Open Circuit Voltage (V) | Heat Dissipation ($\mu$W) | % Self Discharge Per Year |
|---|---|---|---|
| 1 | 3.257 | 7.3 | 1.0% |
| 2 | 3.256 | 5.5 | 0.8% |
| 3 | 3.259 | 6.2 | 0.9% |

No statistically significant difference was seen between the microcalorimetry data for any of the cells regardless of whether they contained hydrogen fluoride or not.

Thus, the existence of voltage delay is due to the formation of an anode surface passivation layer that is ionically less conductive than either the anode material itself or the electrolyte solution. In the presence of hydrogen fluoride as an electrolyte additive according to the present invention, the anode passivation layer is chemically modified to be ionically more conductive than the passivation layer formed without the benefit of the additive. It is believed that due to the presence of hydrogen fluoride in the electrolyte, LiF may produce an electrically insulating and ionically conductive surface film on the anode. This surface film is ionically more conductive than the film formed in the absence of the hydrogen fluoride additive and it is responsible for the increased cell performance, especially during pulse discharge applications. As a consequence, diminished voltage delay results when an alkali metal/transition metal oxide couple activated with a nonaqueous organic solvent having hydrogen fluoride as an additive dissolved therein according to the present invention is subjected to a pulse discharge application, such as occurs in actuation of an implantable medical device.

It is appreciated that various modifications to the inventive concepts described herein may be apparent to those of ordinary skill in the art without departing from the spirit and scope of the present invention as defined by the appended claims.

What is claimed is:

1. In combination with an implantable medical device requiring at least one current pulse for a medical device operating function, an electrochemical cell which is dischargeable to deliver the current pulse while exhibiting reduced voltage delay, the cell which comprises:
   a) an anode comprising lithium;
   b) a solid cathode of silver vanadium oxide as an electrically conductive material; and
   c) a nonaqueous electrolyte activating the anode and the cathode, the nonaqueous electrolyte comprising:
      i) a first solvent selected from the group consisting of an ester, an ether and a dialkyl carbonate, and mixtures thereof;
      ii) a second solvent selected from the group consisting of a cyclic carbonate, a cyclic ester and a cyclic amide, and mixtures thereof; and
      iii) a hydrogen fluoride additive present in the electrolyte at about 0.20M, wherein the activated anode and cathode provide the electrochemical cell dischargeable to deliver at least one current pulse for the medical device operating function, and wherein the current pulse is of an electrical current of a greater amplitude than that of a current immediately prior to the pulse.

2. The combination of claim 1 including an alkali metal salt dissolved therein, wherein the alkali metal of the salt is the same as the alkali metal comprising the anode.

3. The combination of claim 1 wherein there are at least two pulses delivered in succession with or without an open circuit period between the pulses.

4. The electrochemical cell of claim 3 wherein the current pulses are of about 18.4 mA/cm$^2$.

5. The electrochemical cell of claim 1 wherein the first solvent is selected from the group consisting of tetrahydrofuran, diisopropylether, methyl acetate, diglyme, triglyme, tetraglyme, 1,2-dimethoxyethane, 1,2-diethoxyethane 1-ethoxy,2-methoxyethane, dimethyl carbonate, diethyl carbonate, dipropyl carbonate, ethyl methyl carbonate, methyl propyl carbonate and ethyl propyl carbonate, and mixtures thereof.

6. The electrochemical cell of claim 1 wherein the second solvent is selected from the group consisting of propylene carbonate, ethylene carbonate, butylene carbonate, acetonitrile, dimethyl sulfoxide, dimethyl formamide, dimethyl acetamide, γ-valerolactone, γ-butyrolactone and N-methyl-pyrrolidinone, and mixtures thereof.

7. The electrochemical cell of claim 1 wherein the alkali metal salt is selected from the group consisting of LiPF$_6$, LiBF$_4$, LiAsF$_6$, LiSbF$_6$, LiClO$_4$, LiAlCl$_4$, LiGaCl$_4$, LiC(SO$_2$CF$_3$)$_3$, LiN(SO$_2$CF$_3$)$_2$, LiSCN, LiO$_3$SCF$_2$CF$_3$, LiC6F$_5$SO$_3$, LiO$_2$CCF$_3$, LiO$_2$, LiSO$_3$F, LiB(C6H$_5$)$_4$ and LiCF$_3$SO$_3$, and mixtures thereof.

8. The electrochemical cell of claim 1 wherein the cathode comprises from about 80 to about 99 weight percent of the electrically conductive material.

9. The electrochemical cell of claim 1 wherein the cathode further comprises a binder material and a conductive diluent.

10. The electrochemical cell of claim 9 wherein the binder material is a fluro-resin powder.

11. The electrochemical cell of claim 9 wherein the conductive diluent is selected from the group consisting of carbon, graphite powder and acetylene black and metallic powder selected from the group consisting of titanium, aluminum, nickel and stainless steel, and mixtures thereof.

12. The electrochemical cell of claim 1 wherein the cathode comprises from about 0 to 3 weight percent carbon, about 1 to 5 weight percent of a powder fluoro-resin and about 94 weight percent of the electrically conductive material.

* * * * *

UNITED STATES PATENT AND TRADEMARK OFFICE
CERTIFICATE OF CORRECTION

PATENT NO. : 6,117,591
DATED : Sep. 12, 2000
INVENTOR(S) : Takeuchi et al.

It is certified that error appears in the above-identified patent and that said Letters Patent is hereby corrected as shown below:

Col. 14, line 2 - "LIN (SO$_2$CF$_3$)$_2$" should be -- LiN(SO$_2$CF$_3$)$_2$ --.

Col. 14, line 2 - "LIO$_3$SCF$_2$CF$_3$" should be -- LiO$_3$SCF$_2$CF$_3$ --.

Col. 14, line 3 - "LiC6F$_5$SO$_3$" should be -- LiC$_6$F$_5$SO$_3$ --.

Signed and Sealed this

Twenty-ninth Day of May, 2001

Attest:

NICHOLAS P. GODICI

Attesting Officer  Acting Director of the United States Patent and Trademark Office